United States Patent [19]

Endo et al.

[11] Patent Number: 4,614,424

[45] Date of Patent: Sep. 30, 1986

[54] COPYING APPARATUS

[75] Inventors: Akinori Endo; Tatsumi Shimanari; Shunji Watanabe, all of Tokyo, Japan

[73] Assignees: Casio Electronic, Mfg. Co. Ltd.; Casio Computer Co., Ltd., both of Tokyo, Japan

[21] Appl. No.: 649,708

[22] Filed: Sep. 12, 1984

[30] Foreign Application Priority Data

Jan. 20, 1984 [JP] Japan .................................... 59-7028

[51] Int. Cl.[4] ........................ G03B 27/34; G03B 27/40

[52] U.S. Cl. ......................................... 355/56; 355/57; 355/58; 355/66

[58] Field of Search ........................ 355/56, 57, 58, 59, 355/66

[56] References Cited

U.S. PATENT DOCUMENTS 4,368,976 1/1983 Shogren ................................ 355/57

*Primary Examiner*—Monroe H. Hayes
*Attorney, Agent, or Firm*—Sandler & Greenblum

[57] ABSTRACT

The present invention relates to a copying apparatus capable of changing the copying magnification, by moving and positioning optical members such as lens and mirror and changing the scanning speed of the scanning optical system, wherein the moving and positioning of optical members and the selecting of the scanning speed can be attained by a single motor.

23 Claims, 7 Drawing Figures

COPYING APPARATUS

DETAILED DESCRIPTION OF THE INVENTION

1. Field of the Invention

The present invention relates to a copying apparatus and, more particularly, it relates to a magnification changing device employed by the copying apparatus to change the scanning speed of the scanning optical system as well as control the positions of optical members such as lenses.

2. Background of the Invention

As the copying apparatus becomes more and more popular and it is used more and more widely, the demand for reducing or enlarging the original by a desired magnification as well as only copying and reproducing the original has increased these days.

Various manners of reducing or enlarging the original by any desired magnification have been proposed. One of the magnification changing manners which were employed conventionally was to change the positions of mirrors, and the distance from the original to the photosensitive body.

FIG. 1 shows an example of the optical system in the conventional copying apparatus of this type.

When a switch (not shown) for a desired copying magnification is pushed, a reversible motor 201 rotates together with a gear 202 which is fixed to the reversible motor 201. Gears 204, 205 and a driving pulley 206 are fixed to a pulley shaft 203. The rotation of the gear 202 is transmitted to the gear 204. A lens table 209 is fixed to a part of a wire 208 which is stretched between two idle pulleys, with the driving pulley 206 interposed between them. The wire 208 is selectively run by the reversible mirror 201 to reciprocate the lens table 209 in any of directions shown by an arrow. When the lens table 209 comes to a position which represents a selected magnification, it makes operative one of micro-switches 211, 212, 213 and 214 which are located along its passage, and the reversible motor 201 is stopped responsive to a switch signal applied from the appropriate switch to thereby stop the lens table 209, to which a lens 210 is fixed, at the position corresponding to that micro-switch. Since the gear 205 is fixed to the pulley shaft 203, the rotation of the reversible motor 201 is transmitted at the same time to a gear 215 through the gear 205 to rotate a tangential cam 217 via a cam shaft 216. When the cam 217 is rotated, a lever 218 rotates taking a lever shaft 219 as its fulcrum and a wire 221 is pulled to move a mirror table 220. Since a mirror 223 is made integral to the mirror table 220, the mirror 223 is moved to the position which denotes the selected magnification.

In the case of changing the copying magnification, however, it is necessary to move optical members such as lens and mirror and also to change the scanning speed of the scanning optical system. In the above conventional apparatus, expensive and complex speed change mechanism which uses electromagnetic clutch and such like, or expensive variable speed motor, is also necessary to carry out the above movement.

SUMMARY OF THE INVENTION

The present invention is intended to eliminate the above-mentioned drawbacks.

The object of the present invention is therefore to provide a copying apparatus capable of simply and easily performing positional movement of optical members such as lens and mirror and changing the scanning speed of the scanning optical system.

The object of the present invention can be achieved by a copying apparatus capable of changing the copying magnification comprising a means for scanning an original or exposure lamp to expose the whole of the original and having a means for providing plural kinds of scanning speeds which correspond to various copying magnifications; optical members for guiding the image of the original, which is exposed by the exposure lamp, to photosensitive a body; a means for designating a copying magnification; and a control means provided with a single motor which is driven by the copying magnification designating means and serves to move the optical members, because of to the drive of the motor, to those positions which correspond to the copying magnification designated by the copying magnification designating means and also to change the scanning speed of the scanning means to that one which corresponds to the copying magnification designated by the copying magnification designating means.

PREFERRED EMBODIMENT OF THE INVENTION

Figure 1:
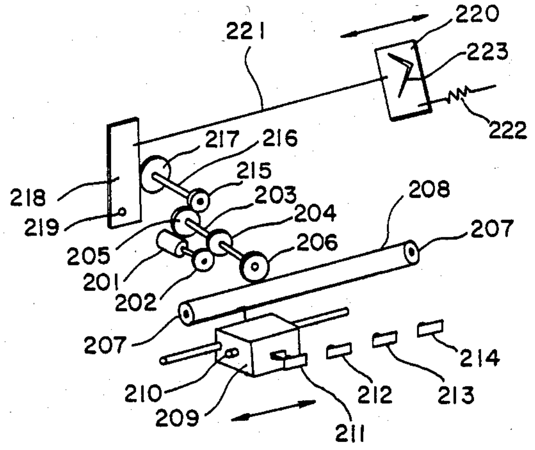
FIG. 1 shows an example of the optical system in the conventional copying apparatus.
Figure 2:
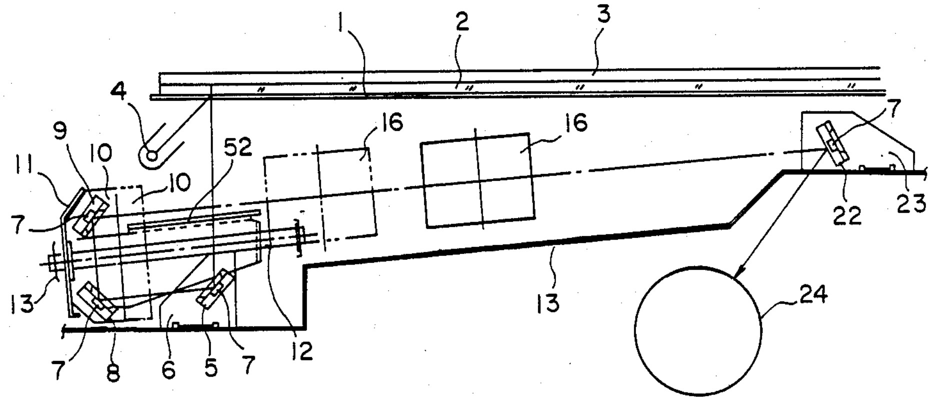
FIG. 2 is a sectional view showing an example of the optical system according to the present invention.

An embodiment of the present invention will be described below in detail referring to the accompanying drawings. FIG. 2 is a sectional view showing an optical system employed in an embodiment of the present invention, FIG. 3 a plan view showing the main portion of the embodiment of the present invention, FIG. 4 a sectional view taken along a line m—m in FIG. 3, and FIG. 5 a view taken in the direction shown by an arrow A in FIG. 3.

In FIG. 2, an original table 1 comprises a transparent glass plate 2 and an original mat 3. The original mat 3 is made of flexible material such as white rubber and synthetic resin and attached, at one side thereof, to the original table 1 by means of hinges or the like.

An optical system comprises an original exposing lamp 4, first mirror 5, first mirror table 6, mirror holder 7, second mirror 8, third mirror 9, mirror attaching table 10, second mirror table 11, second mirror shaft 12, lens 16, fourth mirror 22, fourth mirror table 23 and mirror actuating plate 52. The first mirror 5 is fixed to a copying apparatus body 13 in such manner of its being fixed to the first mirror table 6 by the mirror holder 7. The mirror attaching table 10 is fixed to the second mirror table 11, and the second and third mirrors 8 and 9 are fixed to the mirror attaching table 10 by the mirror holders 7, respectively. The fourth mirror 22 is fixed to the copying apparatus body 13 by the fourth mirror table 23 and the mirror holder 7.

Light emitted from the original exposing lamp 4 is reflected by the surface of an original and imaged on a photosensitive body 24 after being reflected by the first, second and third mirrors 5, 8 and 9, passing through the lens 16, and then being reflected by the fourth mirror 22.

In the case of providing that the optical length between the principal point of the lens 16 and the original is (a), that the optical length between the principal point of the lens 16 and the photosensitive body 24 is (b), and that the focal length of the lens 16 is (f), a light image of the original magnified by a magnification (m) can be formed on the photosensitive body 24 if $1/a+1/b=1/f$, $m=b/a$ in this case. When (a) and (b) are shown by (m) and (f), $a=(m+1)f/m$ and $b=(m+1)f$. For the purpose of changing the magnification (m) of copied images without changing the focal length of the lens 16, therefore, values of (a) and (b) must be changed. In the case of this embodiment of the present invention, the values of (a) and (b) are changed by moving the lens 16 and second and third mirror 8, 9 in the directions shown by two-dot and dash lines in FIG. 2, thereby changing the magnification of copied images.

Figure 3:
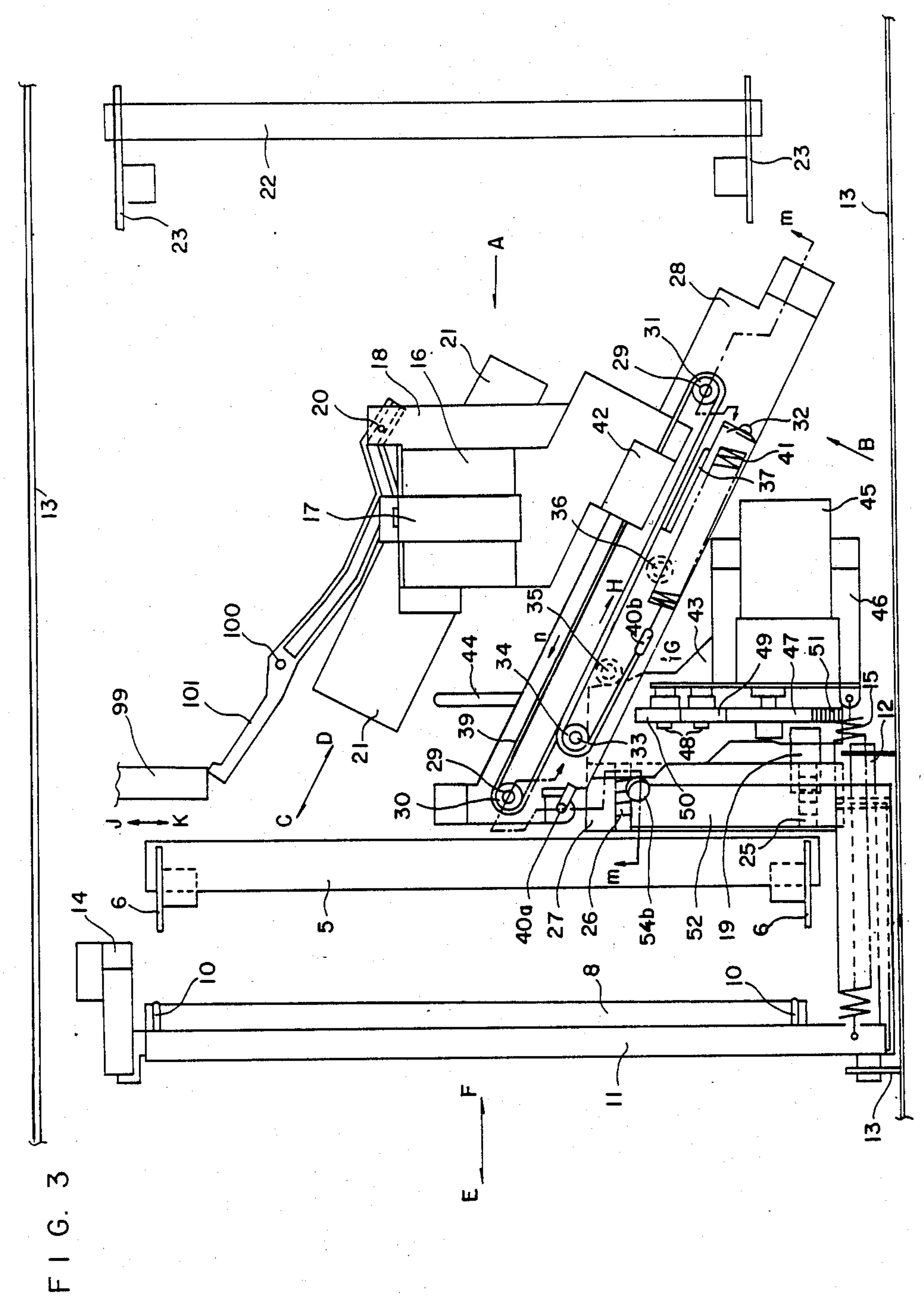
FIG. 3 is a plan view showing the main portion of an embodiment of the present invention.

In FIG. 2 and 3, this side end of the second mirror table 11 is supported, freely slidable right and left, by the second mirror shaft 12 which is fixed to the copying apparatus body 13, The other end of the second mirror table 11 is supported by a bearing 14 to smoothly move right and left. The mirror actuating plate 52 to which a shaft 53 (FIG. 4) is fixed is attached to the second mirror table 11. Fitted onto the shaft 53 is a roller **54*b* which is contacted with a linear cam 43, which will be described later, to move the second mirror table right and left (or in directions E and F), and a spring 15 is stretched between the second mirror table 11 and a motor table 46, which will be described later, to cause the roller 54*b* and the linear cam 43** to be contact each other.

Figure 5:
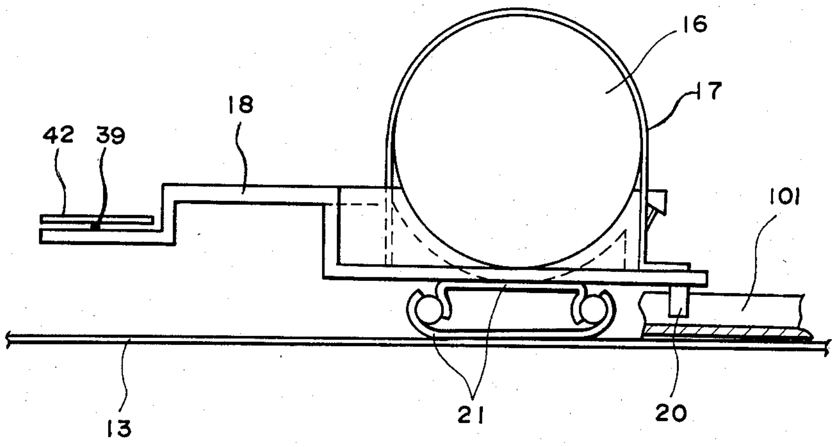
FIG. 5 is a view taken in the direction A in FIG. 3.

A structure installed with the lens 16 will be described below. In FIG. 5, the lens 16 is fixed on a lens table 18, using the resiliency of a lens band 17. The lens table 18 is attached onto a lens rail 21 which is fixed to the copying apparatus body 13 at a predetermined position thereof since the lens table 18 is needed to move along the optical axis of lens so as to obtain a desired magnification. The lens 16 is moved along the lens rail 21 in directions C and D by means of a wire 39 which is fixed to the lens table 18 by a wire holder 42. The lens table 18 in the embodiment of the present invention also has a function of changing the speed of scanning the original table, and this function will be described later.

Figure 6:
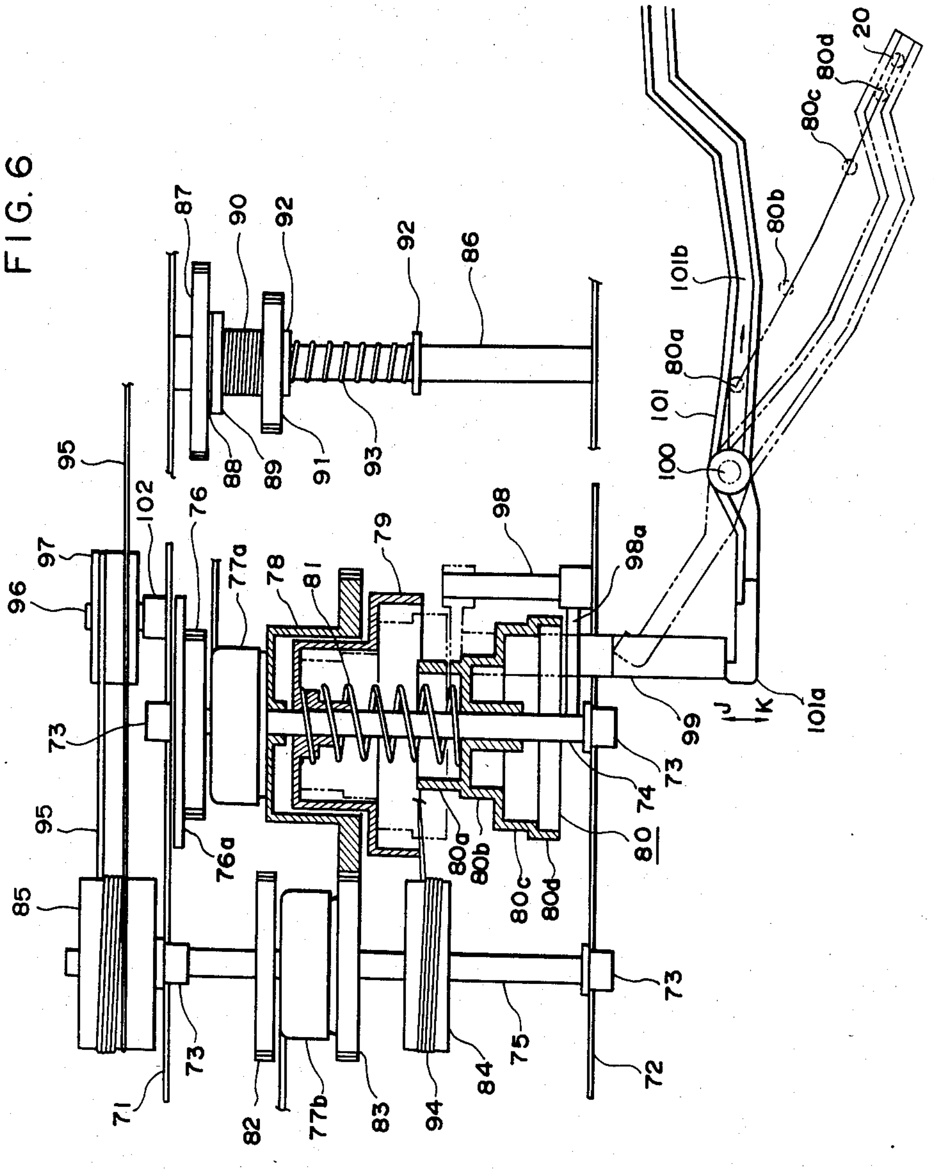
Fig. 6 is a sectional view showing the main portion of a mechanism for changing the optical scanning speed.

As shown in FIGS. 3, 5 and 6, a pin 20 is erected from the underside of the lens table 18, and a changeover arm 101 engaged with the pin 20 in a speed changing groove thereof is supported rotatably around a shaft 100, by the copying apparatus body 13. The other end of this changeover arm 101 is engaged with a changeover lever 99 of a speed changing mechanism which will be described later. When the lens table 18 moves in the directions C and D upon setting of the predetermined magnification, thus moving the pin 20 in the groove of the changeover arm 101, the changeover lever 99 moves in directions J and K, corresponding to the lens table 18 direction of movement, to thereby move a multi-stepped pulley 80 to change the speed.

As shown in FIG. 6, the changeover lever 99 is usually urged in the direction K by means of a compression spring 81.

Figure 4:
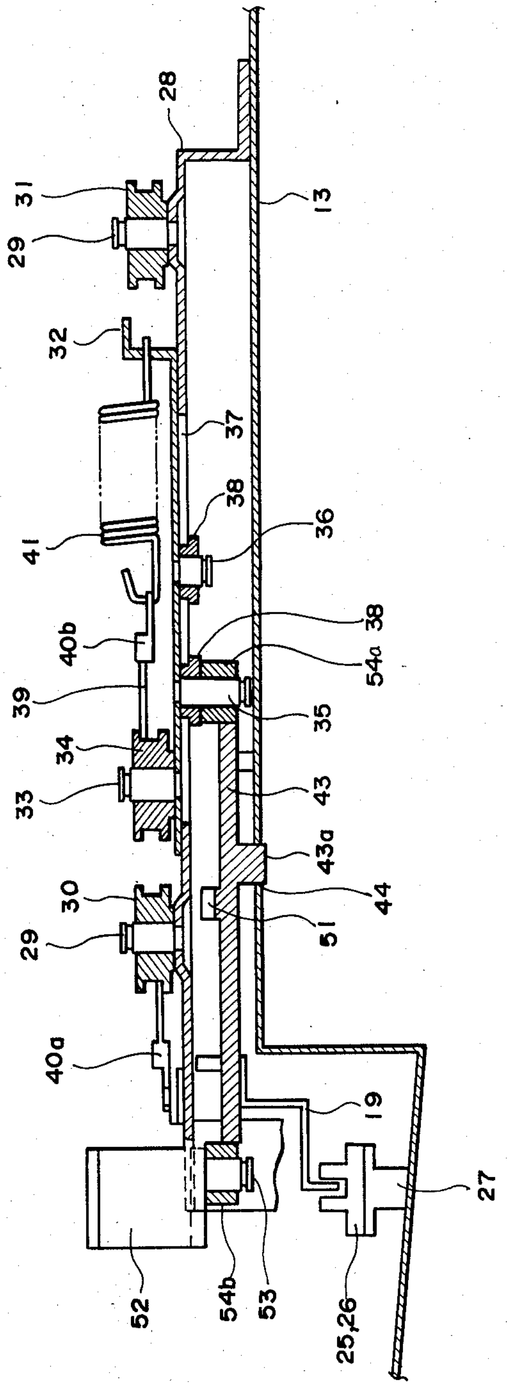
FIG. 4 is a sectional view taken along a line m—m in FIG. 3.

Drive mechanism of magnification changing operation will be described below. The lens table 18 is driven by the wire 39, as shown in FIGS. 3 and 4, and the wire 39 is stretched around a group of pulleys on a wire fixedly attaching table 28 to the copying apparatus body 13, Pulley shafts 29 for pulleys 30 and 31 are separated from each other and located at predetermined positions on the wire attaching table 28, which is also provided with a guide opening 37 for smoothly moving a tension lever 32 to move the lens table 18.

Shafts 35 and 36 arranged on the underside of the tension lever 32 are slidably engaged in the guide opening 37 through bearings 38. A roller **54*a* is attached, together with the bearing 38, to the shaft 35 and engaged with the cam surface of the linear cam 43** to transmit the displaced amount thereof.

A pulley 34 around which the wire 39 is stretched is freely, rotatably attached to a pulley shaft 33 on the upper surface of the tension lever 32.

A manner of stretching the wire 39 will be described below. One end of the wire 39 is fixed to the wire attaching table 28 by means of a terminal **40*a*, letting the wire 39 be wound half around the pulley 34 on the tension lever 32, pulley 30, and then pulley 31. The other end of the wire 39 thus wound around the pulleys is engaged with a tension spring 41 through a terminal 40*b* after the wire 39 is further wound half around the pulley 34. The other end of the spring 41 is fixed to the tension lever 32. The lens table 18 and wire 39 are fixed at a predetermined position between the pulleys 30 and 31**.

Driving of the linear cam 43 will be described below. In FIGS. 3 and 4, a convex portion **43*a* arranged on the underside of the linear cam 43 slides along an elongated groove 44 in the copying apparatus body 13, with the cam 43 fallen in the groove 44**.

A rack 51 is arranged, parallel to the groove 44, on the upper surface of the linear cam 43. A reversible motor 45 for driving the linear cam 43 is fixed to the copying apparatus body 13 through the motor table 46. A gear 47 is attached to the output shaft of the motor 45 to transmit rotation force to the rack 51 on the linear cam 43 through idle gears 49 and 50 which are supported by two idle shafts 48 on the motor table 46. More specifically, the rotation force of the motor 45 is transmitted from the idle gear 49 to the idle gear 50, whose rotation force is converted to linear movement by means of the rack 51 to drive the linear cam 43. The power source for the motor 45 is controlled to go on and off by means of position sensors or the like, which will be described later, at the time of changing the magnification to the desired one to thereby stopping the linear cam 43 at a predetermined position.

The linear cam 43 has two cam faces, one of which serves to control the position of the lens table 18 and comes in contact with the roller **54*a* which is urged against this cam face by means of the spring 41. The lens table 18 is moved two times the moving amount of the roller 54*a* by means of the mechanism which comprises the wire 39 and pulley 34. Therefore, this cam face has a contour that allows the roller 54*a* to move half the moving amount of the lens 16 along the optical axis. That portion of the cam face which corresponds to a magnification has a linear contour which allows the motor 45 to shift in position because of its inertial force when it is stopped by the position sensors 25, 26 and the like. The connecting area between those portions of the cam face is made inclined so as not to change to the operation of the motor 45** (same thing can be said about the other cam face which will be described next).

The other cam face of the linear cam 43 serves to control the position of the second mirror table 11 which includes the second and third mirrors 8 and 9. The object of this cam face is to move the second mirror table 11 in the directions E and F so as to change the distance between the original and the photosensitive body at the time the magnification is changed to the desired one. Since the second and third mirrors 8 and 9 are arranged on the second mirror table 11 in the case of this embodiment, it is apparent that the second mirror table 11 may be moved half the distance between the original and the photosensitive body which is to be changed at the time of the magnification change. The roller 54*b* which is fixed to the mirror actuating plate 52 is forced against this cam face by means of the spring 15, the mirror actuating plate 52 being attached to the second mirror table 11.

Although the linear cam 43 is arranged as described above, the positional relationship between the two cam faces has no particular limitation but a relative relation may be held every magnification.

Positional detection of the linear cam 43 and control of the motor 45 will be described every copying magnification.

The linear cam 43 is moved by the rotation of the motor 45 through the idle gears 49 and 50. An actuator 19 is attached to the underside of the linear cam 43 to actuate the position sensors 25 and 26 which are attached to the copying apparatus body 13 at the predetermined positions thereof through a sensor attaching plate 27. The number of the position sensors 25, 26 corresponds to that of the copying magnifications, and the power source for the motor 45 is turned off when the actuator 19 renders operative the position sensor which corresponds to the copying magnification selected. The linear cam 43, lens table 18 and second mirror table 11 are thus stopped at those positions which correspond to the copying magnification selected.

Figure 7:
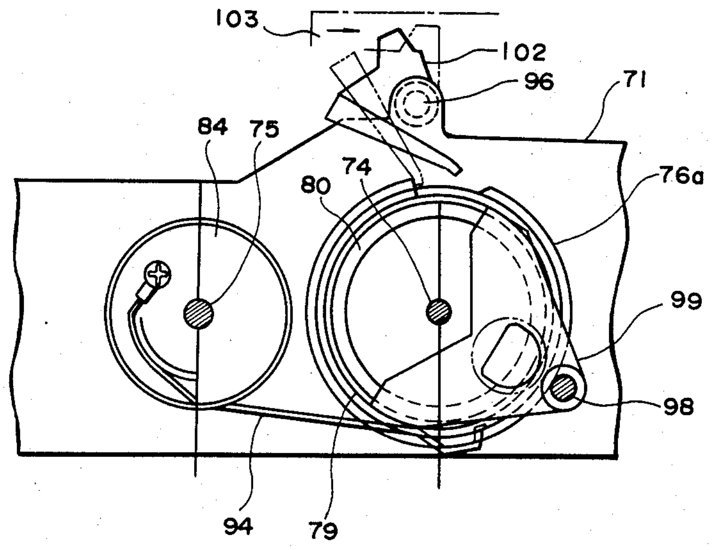
FIG. 7 is a side view showing the main portion of the mechanism shown in FIG. 6.

FIGS. 6 and 7 show a variable-speed drive means according to the present invention.

The variable-speed drive means is made as a unit and fixed to the copying apparatus body 13 by means of a bracket attached to a frame 71 and 72. The frames 71 and 72 are fixed by means of a stay 86 and another stay (not shown) to have a predetermined interval between them. Shafts 74 and 75 are supported, freely rotatable, by bearings 73 arranged at the frames 71 and 72. Fitted onto the shaft 74 are a gear 76, clutch 77*a*, gear 78, winding-up core 79, multi-stepped pulley 80 and compression spring 81. Also fitted onto the shaft 75 are a gear 82, clutch 77*b* gear 83, and pulleys 84 and 85. Also fitted onto the stay 86 are a gear 87, friction plate 88, boss 89, one-way spring 90, gear 91, spring seat 92 and compression spring 93. Although the stay 86 is practically located in such a way that the gear 87 is engaged with the gear 76 and that the gear 91 is engaged with the gear 82, FIG. 6 shows those members, which form the variable-speed drive means, developed in the right direction thereof. The gear 78 which is freely rotatably supported by the shaft 74 is engaged with the gear 83 which is freely rotatably supported by shaft 75. One end of a wire 94 is fixed to the shaft 74, while the other end thereof is fixed to the pulley 84 by means of a screw after the wire 94 itself is wound around the pulley 84 by a sufficient length as to allow the original table to move to its maximum extent, the pulley 85 is fixed to the shaft 75. A wire 95 is wound around the pulley 85 fixed to the outside of the frame 71 of the shaft 75. One end of the wire 95 is fixed to the back end of the original table when viewed in its moving direction at the time of copying operation. The wire 95 is then fitted into a groove formed, adjacent to the frame 71, on an idle pulley 97 which is freely rotatbly supported by a shaft 96 on the frame 71. After being wound one time around around the pulley 85, the wire 95 is fixed to the pulley 85 by a screw and then fitted into another groove on the idle pulley 97 after it is further wound around the pulley 85 by a sufficient length as to allow the original table to move to its maximum extent. The other end of the wire 95 is finally fixed to the front end of the original table by means of a tension spring (not shown). The compression spring 81 is interposed between the winding-up core 79 fixed to the shaft 74, and the multi-stepped pulley 80 which is freely rotatably and axially movably attached to the shaft 74. Compression spring 81 thereby urges the multi-stepped pulley 80 against the frame 72. A changeover lever 99 which is axially movably attached to a guide shaft 98 on the frame 72 contacts the circumferential end face of the multi-stepped pulley 80, as shown in FIG. 6, and limits the movement of the multi-stepped pulley 80 in the axial direction of the shaft 74 when a boss portion 98*a* which slides on the guide shaft 98 of the changeover lever 99 contacts the frame 72. The projection of the changeover lever 99 extends outside through an opening of the frame 72. The front end of the changeover lever 99 is contacted with an actuating end 101*a* of the changeover lever 101 which is freely rotatably supported by the shaft 100 which is attached to the copying apparatus body 13. The gear 91 which is engaged with the gear 82 fixed to the shaft 75 and which is freely rotatably supported by the stay 86 transmits only one-way rotation to the gear 87 through the friction plate 88, because the one-way spring 90 is interposed between the boss portion of the gear 91 and the boss 89 and because the compression spring 93 urges the gear 91 toward the gear 87.

When a desired magnification is selected by pushing the magnification switch at the time of copying operation, the lens 16 moves to a position which corresponds to the selected magnification, as described above. The case where the original is copied in reduced size will be described as an example. When the pin 20 of the lens table 18 which is engaged into the guide groove 101*b* of the changeover arm 101 rotates the changeover arm 101 by a predetermined angle, the actuating end 101*a* thereof pushes the front end of the projection of the changeover lever 99 to move the multi-stepped pulley 80 to a predetermined position.

To describe the multi-stepped pulley 80 in more detail, it has four steps whose diameters are successively enlarged when viewed from the winding-up core 79 toward the frame 72 in FIG. 6. In the case of the copying apparatus which is intended to copy the original in various magnifications, it is necessary to change the relative speed between the photosensitive body and the optical scanning according to every magnification. The manner of changing only the optical scanning speed is usually employed. The present invention intends similarly to change the optical scanning speed (moving speed of the original table). Providing that the moving speed of the original table is V at the time of copying an original in real size, it is $V \times 1/m$ at the time of selecting an optional magnification (m). Since the number of rotations of the pulley is fixed regardless of the magnifications, the diameter of each of the stepped portions of the pulley is made different from one another for every magnification. In short, the smallest-diameter portion 80*a* of the multi-stepped pulley 80 is used to reciprocate the original table at the time of copying the original in enlarged size, the portion 80*b* thereof at the time of copying the original in real size, and the portions 80*c* and 80*d* at the time of copying the original in reduced sizes I and II. The width of each of the stepped portions becomes larger as the diameter thereof becomes smaller, because the the number of times the wire 94 is wound around each of the stepped portions is different from each another when the original table moves to its maximum extent for each different manification.

Although the four-stepped pulley 80 has been employed in the embodiment of the present invention because the magnifications are four kinds, it should be understood that kinds of magnification and number of stepped portions are not limited to those cited above.

Responsive to a copying signal, counter-clockwise drive is transmitted from the motor (not shown) to the gear 78 at the time of copying operation (it will be assumed hereinafter that the rotating direction is viewed on the side of the frame 72). When a signal for advancing the original table is applied to the clutch 77*a* supported by the shaft 74, the clutch plate of the gear 78 is engaged with the rotor inside the clutch fixed to the shaft 74 to thereby transmit rotation to the shaft 74. The winding-up core 79 fixed to the shaft 74 thus begins rotating. The wire 94 wound around the pulley 84 begins winding around a selected stepped portion of the multi-stepped pulley 80 which has moved to the predetermined position, and when it winds substantially one time around the selected stepped portion, it is wound from the pulley 84 at a speed suitable for a selected magnification to rotate the shaft 74 in the counter-clockwise direction, so that the pulley 85 fixed to the shaft 75 is rotated to advance the original table. The moving amount of the original table caused when the wire 94 winds about one time around the multi-stepped pulley 80 is within the distance during which the original table begins its practical advance. When the advance of the original table is finished, the clutch 77*a* of the shaft 74 is turned OFF, while the clutch 77*b* of the shaft 75 is turned ON. The gear 83 is engaged with the gear 78 to transmit clockwise rotation. When the clutch 77*b* of the shaft 75 is turned ON, the clutch plate of the gear 83 is engaged with the rotor inside the clutch fixed to the shaft 75 to rotate the shaft 75. When the shaft 75 rotates in the clockwise direction, the pulley 85 is also rotated in same direction to retreat the original table. At the same time, the wire 94 wound around the multi-stepped pulley 80 is re-wound around the pulley 84. When the original table is retreated to its start position, a lever 103 (FIG. 7) attached to the original table is contacted with the seat of a stopper 102 which is freely rotatably attached to the shaft 96 and which is urged in the clockwise direction by a spring (not shown). The stopper 102 is thus rotated in the clockwise direction, causing its claw to enter into the cut-away portion of a flange 76*a* of the gear 76, so that the rotation of the shaft 74 is locked and the rotation of the winding-up core 79 is limited when the original table is at its start position. The above describes the operation of the copying apparatus.

The case in which the original table is moved by external force (or hands) when the driving power source is stopped at the time there is no copying operation will be described below.

When the original table is advanced, the pulley 84 is rotated through the shaft 75 to unwind the wire 94 since the pulley 85 is rotated in the counter-clockwise direction. However, the gear 82 fixed to the shaft 75 is engaged with the gear 91, which is freely rotatably supported by the stay 86, to thereby transmit clockwise rotation. The one-way spring 90 is pressed to transmit the rotation to the boss 89, and then to the gear 87 through the friction plate 88. Counter-clockwise rotation is thus transmitted to the gear 76 which is fixed to the shaft 74 engaged with the gear 87. Therefore, the winding-up core 79 is rotated through the shaft 74 to wind the wire 94 around the multi-stepped 80. The number of rotations of the shaft 74 is made larger than that of the shaft 75 because of the gear ratio between the gears 82, 91 and the gears 87 and 76, and the rotation of the winding-up core 79 for winding the wire 94 is faster than that of the pulley 84 for unwinding the wire 94, thereby enabling the wire 94 to be under tension. The rotation of the winding-up core 79 which is more than necessary to enable the wire 94 to have appropriate tension is slipped by the friction plate 88 between the boss 89 and the gear 87 which are supported by the stay 86, thereby preventing the wire 94 from becoming loose or coming off from the winding-up core 79.

When the original table is retreated, the rotation of the shaft 75 is not transmitted to the shaft 74 but the wire 94 wound around the multi-stepped pulley 80 is only wound around the pulley 84, because the one-way spring 90 is loosened under the gear connection between the shafts 74 and 75.

As a variation of the variable-speed drive means according to the present invention, it may be arranged that the multi-stepped pulley 80 is fixed to the shaft 74 and that the winding-up core 79 and pulley 84 are moved in the axial direction. Or the winding-up core 97 may be omitted when a slit is formed in the multi-stepped pulley 80 in the axial direction thereof and one end of the wire 94 is moved in the axial direction by means of the shaft 74.

A magnification changeover operation according to the present invention will be described more concretely.

FIG. 3 shows a state under which a magnification $m_1$ is set, and the position sensor 25 is made operative by the actuator 19 attached to the linear cam 43.

In the case where the magnification $m_1$ is changed to $m_2$ which causes the position sensor 26 to be rendered operative, the motor 45 is rotated in a predetermined direction responsive to a signal applied from the control section (not shown) when a signal representing the magnification $m_2$ is applied. This rotation force causes the linear cam 43 to be moved along the opening 44 in the copying apparatus 13 in a direction shown by an arrow G through the idle gears 49 and 50. The roller 54*a* attached to the tension lever 32 which is in contact with one of the cam faces of the linear cam 43 is moved in a direction shown by an arrow H due to the movement of this cam face. Namely, the whole of the tension lever 32 is moved in the direction H. Since the pulley 34 is attached to the tension lever 32, the pulley 34 is also moved in the direction H by the movement of the tension lever 34. Following the movement of the pulley 34 in the direction H, tensile force is given, because of the principle of pulleys, to the wire 39 between the fixed end 40 of the wire 39 and the pulley 30 to thereby move the wire 39 in a direction shown by an arrow (n). When the wire 39 is moved in the direction (n), the lens table 18 fixed to the wire 39 is moved two times the moving amount of the pulley 34 in the direction H. Namely, the lens table 18 keeps moving in the direction C until the position sensor 26 which corresponds to the desired magnification ($m_2$) is rendered operative by the actuator 19.

The roller **54*b* which is engaged with the other cam face of the linear cam 43 is moved in the direction F by the movement of this cam face. Since the roller 54*b* is attached to the mirror actuating plate 52 which is attached to the second mirror table 11, the second mirror table 11 is also moved in the direction F, following the movement of the roller 54*b*. Therefore, the second mirror table 11 keeps moving in the direction F until the position sensor 26 which corresponds to the desired magnification ($m_2$) is rendered operative by the actuator 19**.

When the actuator 19 makes the position sensor 26 operative, the motor 45 stops rotating and the linear cam 43 also stops moving. The roller **54*a* attached to the tension lever 32 is contacted, this time, with that linear cam face which corresponds to the magnification $m_2$, and even when the inertial force of the motor 45 is added to the roller 54*a* at the time the motor is stopped, the roller 54*a* is not moved and the lens position is not changed because of the contour of the flat face of the linear cam 43**.

Similarly, the roller **54*b* which is engaged with the other cam face of the linear cam 43 to move the second mirror table 11 comes into contact with that cam face of the linear cam 43** which corresponds to the distance between the original and the photosensitive body under the magnification $m_2$.

When the positional adjustment of lens and mirror is finished like this in the course of changing the magnification, it means that the arrangement of optical system is finished under the desired magnification.

The embodiment of the present invention also enables the scanning speed of originals to be changed.

When the magnification $m_1$ is to be changed to $m_2$, the lens table 18 is moved in the direction C, thereby causing the pin 20 attached to the lens table 18 to slide in the groove **101*b* of the changeover arm 101. The changeover arm 101 is thus rotated, taking the shaft 100 as its fulcrum, and the lens table 18 is stopped at that position which corresponds to the magnification $m_2$. Namely, the changeover arm 101 is rotated in a direction which allows the changeover lever 99 to shift in the direction K, and then stop. When the changeover arm 101 is rotated, the changeover lever 99 is usually contacted with the changeover arm 101 by means of the compression spring 81, as described above, and the multi-stepped pulley 80 is moved to the predetermined position, following the movement of the changeover lever 99**, thereby enabling the scanning speed to be changed.

The magnification changing operation attained by the embodiment of the present invention is finished as described above. Although the case where the magnification is changed from $m_1$ to $m_2$ has been described, the process of changing the magnification from $m_2$ to $m_1$ can be similarly attained by rotating the motor 45 in reverse. In short, when the copying magnification is to be changed from $m_2$ to $m_1$, a signal which represents $m_1$ is applied and the motor 45 begins its rotation in a direction reverse to the above-mentioned one responsive to a signal applied from the control section (not shown). The linear cam 43 moves in a direction reverse to the direction G, the roller **54*a* which is contacted with one of the cam faces of the linear cam 43 moves in a direction reverse to the direction H following the movement of the linear cam 43, and the pulley 34 moves in a direction reverse to the direction H. Therefore, wire 39 moves in a direction reverse to the direction n and the lens table 18 moves in the direction D. The roller 54*b* which is contacted with the other cam face of the linear cam 43 moves in the direction E, following the movement of this cam face, and the second mirror table 11** moves in the direction E, too.

The lens table 18 and second mirror table 11 move like this until the position sensor 25 which corresponds to the magnification $m_1$ is made operative by the actuator 19 and the linear cam 43 is stopped. The rollers **54*a* and 54*b* are contacted, this time, with those cam faces which correspond to the magnification $m_1$, respectively. The changeover arm 101 is rotated by the movement of the lens table 18 in the direction D, and the changeover lever 99** is thus moved in the direction J to change the operating speed.

The movement of lens, movement of mirror to correct the distance between the original and the photosensitive body, and operation of sections related to changing the scanning speed and copying magnification can be achieved by operating the single motor and single linear cam 43 as described above.

Although two position sensors 25 and 26 have been cited in the above description for the sake of clarity, the number of the position sensors used may be increased, corresponding to the number of copying magnifications employed.

Although the lens table 18 has been moved in the direction inclined relative to the optical axis of lens in the embodiment of the present invention, it is due to the fact that the position at which the originals are set is fixed. It should be therefore understood that the present invention is not limited by the moving direction of the lens table 18 but that the lens table 18 may be moved along the optical axis.

Although the present invention has been described citing the optical scanning wherein the original table moves, it should be understood that the concept of the present invention can be applied to the optical the type in which the optical system moves and the original table stays fixed in position. As described above, the copying apparatus of the present invention enables optical members such as lens and mirror to be positioned and the scanning speed of the scanning optical system to be changed simply and easily.

What is claimed is:

1. A copying apparatus capable of copying an original at a plurality of different magnifications, said apparatus comprising:

(a) means for scanning said original, said scanning means comprising an exposure lamp for exposing said original as it is scanned and means for scanning said original at a plurality of different speeds, each of said speeds corresponding to one of said magnifications;

(b) a lens and a plurality of mirrors for conducting an image of said original to a photosensitive body;

(c) means for selecting one of said different copying magnifications prior to exposure of said original; and (d) central means for moving said lens and said plurality of mirrors into a position which corresponds to a selected copying magnification and for changing the scanning speed of said scanning means to correspond to said selected magnification, prior to a copying cycle, said control means comprising a linear cam having two camming surfaces located along opposed sides of said cam and first and second rollers which abut said camming surfaces, wherein said first roller is indirectly attached to a lens table holding said lens, and wherein said second roller is indirectly attached to a table for holding one of said mirrors, wherein reciprocation of said cam moves said lens table in a linear fashion at an angle with respect to said cam and said mirror table in a substantially perpendicular fashion with respect to movement of said cam.

2. A copying apparatus in accordance with claim 1 further comprising a pin attached to said lens table and to a first end of a pivotable changeover arm, a second end of said changeover arm abutting a free end of a speed changeover lever, wherein said changeover arm comprises means for moving said lever in a reciprocating fashion in response to reciprocation of said cam.

3. A copying apparatus in accordance with claim 2 wherein said means for changing said scanning speed comprises a pulley with a plurality of discrete stepped portions, wherein said speed changeover lever has a second end abutting said pulley, said lever comprising means for moving said pulley axially in response to pivoting movement of said changeover arm.

4. A copying apparatus in accordance with claim 1 further comprising a lens rail on which said lens table lens table to slidably positioned.

5. A copying apparatus in accordance with claim 1 further comprising a shaft attached to said mirror table, said shaft being attached to said second roller by a mirror actuating plate.

6. A copying apparatus in accordance with claim 1 further comprising a wire attachment table having two pulleys and a wire wrapped around said two pulleys, said wire attachment table being attached to said lens table.

7. A copying apparatus capable of copying at a plurality of different magnifications said apparatus comprising:

(a) means for scanning an original to be copied, said scanning means comprising an exposure lamp for exposing said original as it is scanned and means for providing a plurality of scanning speeds, each of said plurality of scanning speeds corresponding to one of said different magnifications;

(b) means for guiding an image of said original to a photosensitive body said guiding means comprising a lens and a plurality of mirrors;

(c) means for selecting one of said plurality of different copying magnifications prior to exposure of said original; and (d) control means comprising only one motor, said motor being driven, before a copying cycle, by said means for selecting a magnification, said motor comprising means for moving said lens and said plurality of mirrors into positions which correspond to said plurality of different magnifications and to change the scanning speed of said scanning means to correspond to a magnification determined by said designated magnification.

8. The copying apparatus of claim 7 wherein said control means comprises a cam and at least one roller, said cam being driven by said motor, said cam having camming surfaces on two sides of said cam, said cam being moveable to change the speed of said scanning means and to shift the position of said lens and said mirrors.

9. The copying apparatus of claim 8 wherein said control means further comprises a pivotable changeover arm for changing said scanning speed, said changeover arm pivoting in response to the movement of said lens by said cam.

10. The copying apparatus of claim 9 wherein said motor comprises means for reciprocating said cam, said cam having at least one actuating cam face, said cam face comprising two sets of alternating cam face portions, each cam face in a first being inclined relative to the moving direction of said cam and each cam face in a second set being parallel to the moving direction of said cam.

11. The copying apparatus of claim 7 wherein (a) said scanning means comprises:

(i) a multi-stepped pulley comprising a plurality of stepped portions, each of said plurality of discrete stepped portions having different diameters, said stepped portions being arranged in a continuous fashion along an axial direction of said pulley; and (ii) a wire adapted to be wound around said multi-stepped pulley for driving said scanning means; and (b) said control means comprising means for changing the stepped portion of said multi-stepped pulley around which said wire is to be wound in response to selection of a desired magnification.

12. The copying apparatus of claim 7 wherein (a) said scanning means comprises:

(i) a multi-stepped pulley comprising a plurality of discrete stepped portions, each of said plurality of stepped portions having different diameters, said stepped portions being arranged in a continuous fashion along an axial direction of said pulley;

(ii) a wire adapted to be wound around said multi-stepped pulley; and (iii) means for winding said wire around said multi-stepped pulley to drive said scanning means; and (b) said control means comprising means for changing the stepped portion of said multi-stepped pulley around which said wire is to be wound.

13. The copying apparatus of either of claims 11 or 12 wherein said means for changing the stepped portion of said multi-stepped pulley around which said wire is to be wound comprises means for moving said multi-stepped pulley along an axial direction thereof.

14. The copying apparatus of claim 13 wherein said means for moving said multi-stepped pulley moves the pulley axially in response to the positional movement of said lens.

15. The copying apparatus of either of claims 11 or 12 further comprising a plurality of position sensors whereby said motor is selectively turned on in response to actuation of a position sensor which corresponds to said designated magnification.

16. A copying apparatus capable of copying at a plurality of different magnifications said apparatus comprising:

(a) means for scanning an original to be copied comprising:

(i) an exposure lamp for exposing the entire orginal as it is scanned; and (ii) a multi-stepped pulley comprising a plurality of discrete stepped portions, each of said plurality of stepped portions having different diameters, wherein said stepped portions are continuous along the axial direction of said pulley, wherein a wire is wound around said multi-stepped pulley for driving said scanning means at a scanning speed which corresponds to a selected one of said different magnifications;

(b) means for guiding an image of said original to a photosensitive body, said guiding means comprising a lens and a plurality of mirrors;

(c) means for designating one of said plurality of different copying magnifications; and (d) control means for moving said lens and said plurality of mirrors, to positions which correspond to said designated magnification, and for changing the stepped portion of said multi-stepped pulley around which said wire is to be wound to the stepped portion which corresponds to said designated magnification.

17. The copying apparatus according to claim 16 wherein said control means for changing the stepped portion of said multi-stepped pulley around which said wire is to be wound comprises means for moving said multi-stepped pulley along the axial direction thereof.

18. The copying apparatus of claim 17 wherein said pulley is adapted to move axially in response positional movement of said lens.

19. A copying apparatus capable of copying at a plurality of different magnifications said apparatus comprising:

(a) means for scanning an original to be copied comprising:

(i) an exposure lamp for exposing the entire original as it is scanned;

(ii) a multi-stepped pulley comprising a plurality of discrete stepped portions, each of said plurality of stepped portions having different diameters and being continuous along the axial direction of said pulley, wherein a wire is wound around said multi-stepped pulley for obtaining a scanning speed which corresponds to one of said different magnifications; and (iii) means for winding said wire around said multi-stepped pulley for driving said scanning means;

(b) means for guiding an image of an exposed original to a photosensitive body, said guiding means comprising a lens and a plurality of mirrors;

(c) means for designating one of said plurality of different copying magnifications; and (d) control means for moving said lens and said plurality of mirrors, before a copying cycle, to positions which correspond to said designated magnification and for changing the stepped portion of said multi-stepped pulley around which said wire is to be wound to the stepped portion which corresponds to said designated magnification.

20. The copying apparatus of claim 19 wherein said control means for changing the stepped portion of said multi-stepped pulley around which said wire is to be wound further comprise means for moving said multi-stepped pulley and said means for winding said wire in the axial direction of said multi-stepped pulley.

21. The copying apparatus of claim 20 wherein said means for moving said multi-stepped pulley and said means for winding said wire move in accordance with the positional movement of said lens.

22. A photocopying apparatus in accordance with claim 8 further comprising two position sensors for limiting the reciprocating motion of said cam.

23. A photocopying apparatus in accordance with claim 1 further comprising two position sensors for limiting the reciprocating motion of said cam.

* * * * *